Sept. 27, 1966  G. J. GANLEY  3,275,109
FRICTION COUPLING AND BRAKE CONTROL APPARATUS
Filed Nov. 12, 1964
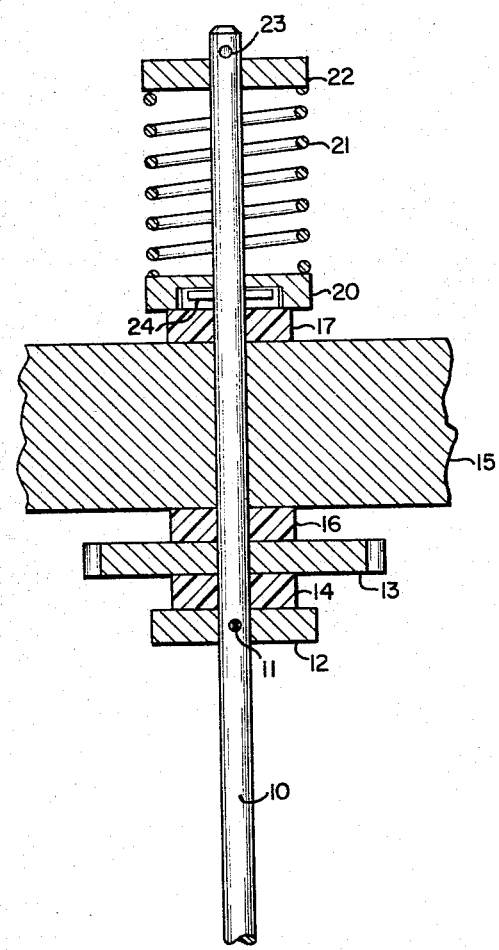
INVENTOR.
GREGORY J. GANLEY
BY
ATTORNEY

United States Patent Office 3,275,109
Patented Sept. 27, 1966

3,275,109
FRICTION COUPLING AND BRAKE CONTROL APPARATUS
Gregory J. Ganley, Minneapolis, Minn., assignor to Honeywell Inc., Minneapolis, Minn., a corporation of Delaware
Filed Nov. 12, 1964, Ser. No. 410,629
6 Claims. (Cl. 192—7)

This invention relates to control apparatus and more particularly to a combined clutch and drag mechanism for insertion between a mechanical drive and a device to be driven such as an indicator.

It is a principal object of the invention to provide a mechanism which combines the functions of a slip clutch and a friction drag in one simple, inexpensive structure having a minimum number of moving parts.

Various other objects, advantages, and features of novelty, not individually enumerated above, which characterize my invention, are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of my invention.

The single figure of the drawing is a showing of the invention in longitudinal section.

Briefly, the invention consists of a drive shaft, a driven gear, and friction means cooperating with the shaft, the gear, and a fixed mounting member to perform the function of a slip clutch, when power is applied to the drive shaft, and that of a friction drag or brake, which acts when the drive shaft is not powered to prevent motion of the device driven through the gear.

In the drawing, a shaft 10 is connected in any suitable fashion to a power source, not shown. Integral with or fastened to the shaft 10, as by a pin 11, is a collar 12. A gear 13 is rotatable on shaft 10, and a first friction washer 14 which may be of cork is located between gear 13 and collar 12.

Shaft 10 passes through a fixed mounting member 15 which acts as a bearing for the shaft. A second friction washer 16 which may be of Teflon is located between gear 13 and member 15.

Carried on shaft 10 on the other side of member 13 is a third friction washer 17 which may likewise be of cork. Also carried on shaft 10 are a slotted collar 20, a compression spring 21, and a collar 22. The whole unit is held in assembled relation, with spring 21 under predetermined compression, by a pin 23. Collar 20 slides on shaft 10 but is constrained to rotate with shaft 10 by pin 24.

When torque is applied to drive shaft 10, the torque available at gear 13 is equal to the torque difference between washers 14 and 16, the former transmitting torque to drive gear 13 and the latter transmitting torque to prevent the gear from being driven.

On the other hand, when no torque is applied to shaft 10 the holding torque exerted on gear 13 is equal to the torque sum of washers 14 and 16, provided that the torque from washer 17 is greater than that from washer 14.

I have thus provided a simple, unitary clutch-drag mechanism in which the holding torque on the driven member when stationary is even greater than the slip torque when the member is being driven.

Numerous objects and advantages of my invention have been set forth in the foregoing description, together with details of the structure and function of the invention, and the novel features thereof are pointed out in the appended claims. The disclosure, however, is illustrative only, and I may make changes in detail, within the principle of the invention, to the full extent indicated by the broad general meaning of the terms in which the appended claims are expressed.

I claim as my invention:

1. In combination: an input shaft; a fixed member with respect to which said shaft is rotatable; an output element rotatable with respect to said shaft and to said member; first friction coupling means between said shaft and said element; second friction means between said member and said element; third friction means between said shaft and said member; and means maintaining interengagement of said member, said element, said shaft, and said friction means.

2. In combination: an input shaft having a collar; an output gear rotatable on said shaft; first friction coupling means between said collar and said gear; a fixed mounting member traversed by said shaft to provide a bearing therefor; second friction means between said gear and said member; third friction means on said shaft; and resilient means carried by said shaft for maintaining frictional engagement through said third friction means between said shaft and said mounting member.

3. In combination, an input shaft having a collar; an output gear rotatable on said shaft; first friction means between said collar and said gear; a fixed member traversed by said shaft to provide a bearing therefor; and having a pair of opposite surfaces substantially normal to said shaft; second friction means between said gear and one of said surfaces; third friction means on said shaft adjacent to the other of said surfaces; and resilient means acting between said shaft and said member, through said third friction means, to maintain frictional engagement between said members, said collar, and said shaft, said resilient means and said gear being located on opposite sides of said fixed member.

4. In combination: a fixed member; a drive member rotatable with respect to said fixed member; a driven member rotatable with respect to both said members; first friction coupling means between said drive member and said driven member; second friction means between said driven member and said fixed member; and third friction means between said fixed member and said drive member.

5. In combination: a fixed member; a drive member rotatable with respect to said fixed member; a driven member rotatable with respect to both said members; first friction coupling means between said drive member and said driven member; second friction means between said driven member and said fixed member; third friction means between said fixed member and said drive member; and resilient means maintaining equal engagement of the several members with the related friction means.

6. In combination: a fixed member; a drive member rotatable with respect to said fixed member; a driven member rotatable with respect to both said members; first friction means between said drive member and said driven member; second friction means between said driven member and said fixed member; and third friction means between said fixed member and said drive member, said third friction means being capable of transmitting greater torque than said first friction means.

References Cited by the Examiner
UNITED STATES PATENTS

| | | | |
|---|---|---|---|
| 1,634,861 | 7/1927 | Weymann | 192—8 |
| 1,770,087 | 7/1930 | Quick et al. | 192—8 |
| 2,682,935 | 7/1954 | Blough | 188—83 X |

DAVID J. WILLIAMOWSKY, *Primary Examiner.*

BENJAMIN W. WYCHE III, *Examiner.*